United States Patent
Rudzik et al.

(10) Patent No.: US 6,453,267 B1
(45) Date of Patent: Sep. 17, 2002

(54) METHOD AND SYSTEM FOR MEASURING SYSTEM AVAILABILITY FOR IN-FLIGHT ENTERTAINMENT SYSTEMS

(75) Inventors: Laurel A. Rudzik, Fullerton; Rodney J. Farley, Yorba Linda; Grant E. Jeffery, Newport Beach, all of CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/580,778

(22) Filed: May 26, 2000

(51) Int. Cl.[7] .............................................. G08B 23/00
(52) U.S. Cl. .................. 702/185; 702/183; 340/825.28
(58) Field of Search ................................ 702/183, 185; 340/825.28, 5.9, 3.44, 945; 455/431; 370/316; 714/712, 713, 715

(56) References Cited

U.S. PATENT DOCUMENTS

| | | | | |
|---|---|---|---|---|
| 3,795,771 A | * | 3/1974 | Gundersen et al. ....... | 179/15 A |
| 4,414,539 A | * | 11/1983 | Armer ........................ | 340/500 |
| 4,675,675 A | * | 6/1987 | Corwin et al. .............. | 340/945 |
| 5,023,791 A | * | 6/1991 | Herzberg et al. ....... | 364/424.04 |
| 5,854,591 A | * | 12/1998 | Atkinson ............... | 340/825.17 |
| 5,889,466 A | * | 3/1999 | Ferguson .................... | 340/602 |
| 6,167,238 A | * | 12/2000 | Wright ........................ | 455/66 |
| 6,189,127 B1 | * | 2/2001 | Fang et al. .................. | 714/799 |
| 6,208,307 B1 | * | 3/2001 | Frisco et al. ................ | 343/757 |
| 6,249,913 B1 | * | 6/2001 | Galipeau et al. .............. | 725/76 |
| 2001/0036822 A1 | * | 11/2001 | Mead et al. ................ | 455/414 |

FOREIGN PATENT DOCUMENTS

| | | | |
|---|---|---|---|
| WO | WO 90/15508 | * | 12/1990 |
| WO | WO 98/11686 | * | 3/1998 |

* cited by examiner

*Primary Examiner*—Marc S. Hoff
*Assistant Examiner*—Carol S Tsai
(74) *Attorney, Agent, or Firm*—Nathan O. Jensen; Kyle Eppele

(57) ABSTRACT

A method and system of measuring availability of an in-flight entertainment system ("IFE") on an aircraft. The method comprises designating a subsystem weight factor to each subsystem of said IFE, with the sum of all subsystem weight factors being equal to a predetermined number, selecting at least one element of the subsystem to measure its availability, designating a zonal weight factor for the at least one element based on a predetermined class to be serviced by the at least one element, assigning an element loss factor based on a level of service for at least one element, collecting performance information regarding the at least one element during a predetermined period of time, and measure the element's availability based on the subsystem weight factor, the zonal weight factor, the element loss factor and the level of service.

12 Claims, 2 Drawing Sheets

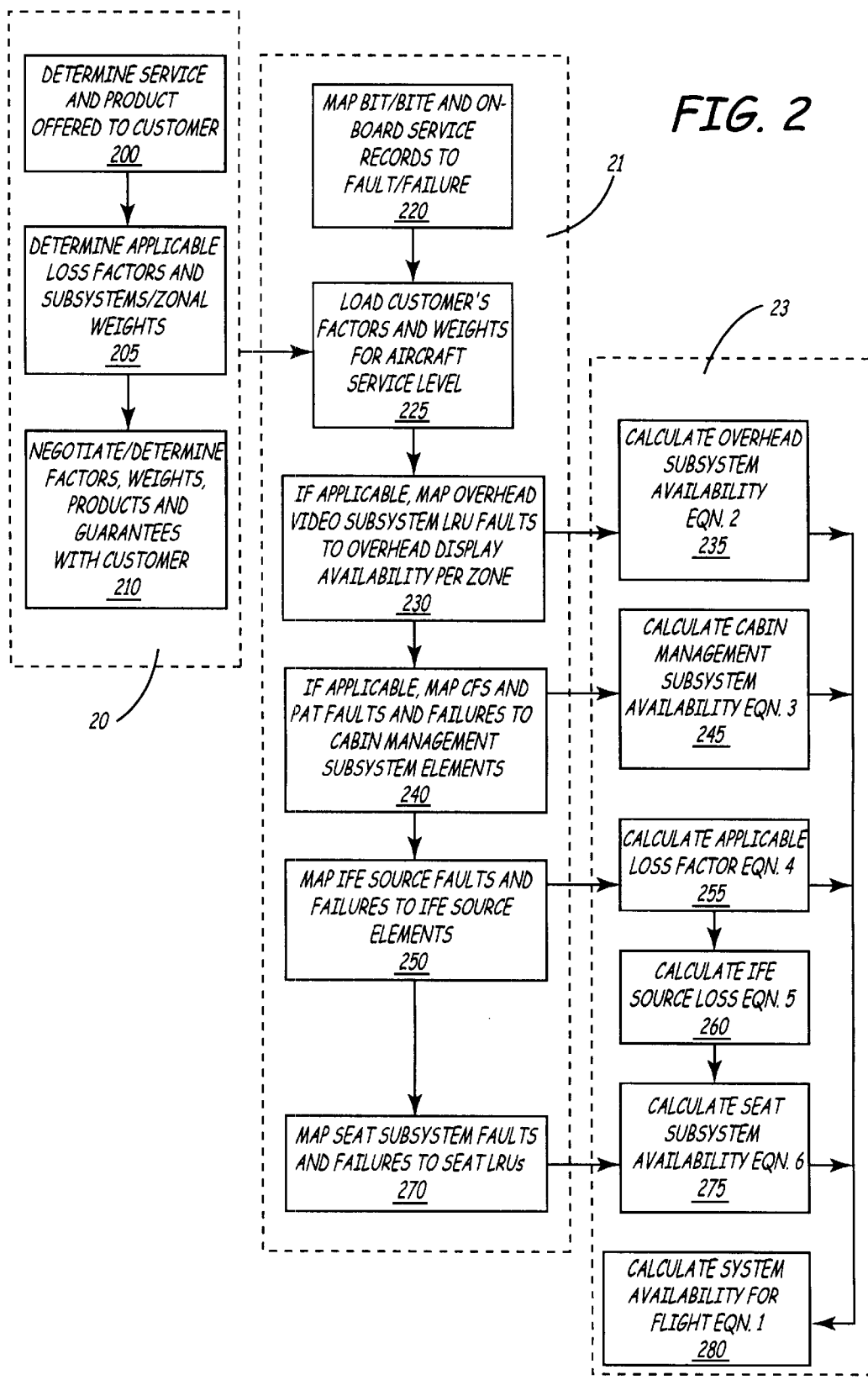

METHOD AND SYSTEM FOR MEASURING SYSTEM AVAILABILITY FOR IN-FLIGHT ENTERTAINMENT SYSTEMS

RELATED FIELD

The present invention relates to in-flight entertainment systems for passenger aircrafts and more particularly relates to a method and system for measuring system availability.

ART BACKGROUND

Commercial passenger airlines continuously try to make air travel as enjoyable as possible. One of such efforts is directed at providing in-flight entertainment systems ("IFE") for passengers on the aircraft. One of the earliest forms of IFE is probably the audio programs through the plastic ear jacks. Then there were the individual systems to offer both audio and video programming. Nowadays, in addition to audio and video programming, passengers begin to expect the airlines to offer a host of features such as video-on-demand, video games, shopping, access to the Internet, phone and facsimile, and landscape camera.

To remain competitive, airlines respond by installing more and more gadgets on-board and at the same time demanding the suppliers for such gadgets to guarantee certain level of performance and availability during flight. Not surprisingly, the more electronics that are crammed into the limited cabin space, the more likely something will malfunction, thus severely affecting the travel experience of the passengers. Airlines thus want to make sure that the suppliers are held accountable by some standards. Measuring system availability for IFEs allows the airlines to ensure that they get their money's worth either in the form of greater customer satisfaction, or in the form of retaining commercial leverage, forcing suppliers to compensate and rectify the system malfunction.

The suppliers, on the other hand, find it necessary to meet airlines' demands for performance and availability. However, each airline has its unique way of measuring system availability based on perceived priorities with different product features, thus resulting in a different set of factors for measurement. In other words, a 98% system availability for one airline customer does not mean the availability is 98% for another airline customer. Despite the lack of uniformity from one customer's measurement to another customer's, a supplier's inability to pass certain negotiated availability criteria is always justification for the supplier to compensate that airline customer. Further, the process of customizing performance requirements for each customer and the process of evaluating and negotiating for compensation become quite cumbersome and labor-intensive for the supplier, not to mention the comparable resources needed by the airline customer on the other side. In a worst-case scenario, an IFE supplier may find itself facing requests for compensation from many of its customers, each one with its own set of availability criteria which the supplier's products did not pass, resulting in conflicting priorities in remedying the system.

Conventionally, an IFE supplier has to rely on large teams of people to analyze and number-crunch for each customer, each month. After the number crunching, a supplier and a customer will attempt to reconcile to see if both parties agree with the numbers that are derived, and the underlying data. For example, if one system was unavailable because a passenger was found tampering with the wiring, that record can be disregarded for the reason of passenger abuse. While each airline customer has its unique approach to measuring system availability, the analysis is essentially derived from the maintenance and service reports of the same IFE hardware of the IFE supplier.

One industry group, Aeronautical Radio Inc., has drafted a set of standards, known as the draft ARINC 628 standard, for measuring IFE system availability. However, the methodology is found to be non-specific in the practical implementation resulting in ambiguous interpretations and therefore different applications for each customer. The standard includes a level of guidance which precludes a level of customization desired by airlines. This approach is therefore subject to abuse by suppliers who interpret it in a manner advantageous to their purpose, and subject to abandonment by airlines who cannot represent their priorities within the guidelines.

Therefore, it is desirable to be able to standardize the way to measure system performance and availability for IFE systems.

It is also desirable to be able to tailor or customize the methodology for different airline customers without affecting the standardized approach.

It is also desirable, if not imperative, to be able to reduce the administrative burden required to assess availability guarantees from customer to customer for the term of the performance guarantee. By way of example only, the magnitude of assessment is in excess of 10,000 individual flights per month spread between a few airlines. This level of effort increases with each airline and each different formula definition.

SUMMARY OF THE INVENTION

A method and system of measuring availability of an in-flight entertainment system ("IFE") on an aircraft is disclosed. The method comprises the steps of designating a subsystem weight factor to each subsystem of said IFE, with the sum of all subsystem weight factors being equal to a predetermined number, e.g. 100%, selecting at least one element of the subsystem to measure its availability, designating a zonal weight factor for at least one element based on a predetermined class to be serviced by at least one element, assigning an element loss factor based on a level of service for at least one element, collecting performance information regarding at least one element during a predetermined period of time, and measure the element's availability based on the subsystem weight factor, the zonal weight factor, the element loss factor and the level of service.

The method and system in accordance with the present invention uses configurable data tables, which allows customization of the calculations without revising the tool, as shown in the following. For example, the element loss factors ("ELF") for the seat system may need to be unique for different IFE service levels to allow more accurate calculations when airlines deploy IFE functionality in phases. In addition, elements that do not apply to an airline's configuration, as indicated by the different service levels, will have a factor of zero.

BRIEF DESCRIPTION OF THE DRAWINGS AND TABLES

FIG. 2 shows a simplified block diagram of the methodology of SA measurement in accordance with the present invention.

DETAILED DESCRIPTION OF THE PREFERRED EMBODIMENT

Figure 1:
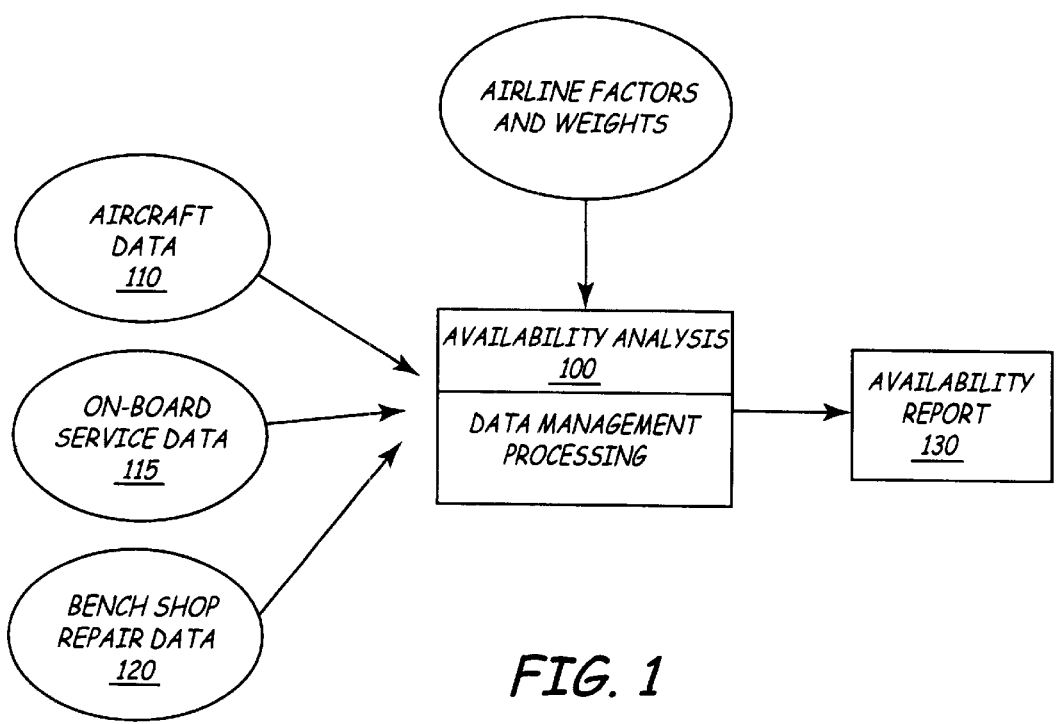
FIG. 1 shows a simplified block diagram illustrating the method and system of SA measurement in accordance with the present invention.

A method and system for measuring system availability for in-flight entertainment systems is disclosed. In the description that follows, numerous specific details are set forth in detail to provide a more thorough understanding of the present invention. It will be apparent, however, to one ordinarily skilled in the art that the present invention may be practiced without these specific details. In other instances, well-known features have not been described in detail so as not to obscure the present invention.

FIG. 1 shows a simplified block diagram illustrating the method and system of SA measurement in accordance with the present invention. To calculate the SA for the IFE systems, data can come from several sources. One of such sources is the aircraft data 110 from a flight, which may include the following data:

Aircraft Tail Number;
Flight Departure Airport;
Flight Arrival Airport;
Date of Flight Arrival;
Flight Number;
Cabin Log Record including:
  Cabin Log record number;
  Indication of Failure;
  Specific Seats or line-replaceable units ("LRU") impacted.

Another source of data is the on-board service data 115 from a flight, which may include the following:

Aircraft Tail Number;
Flight Departure Airport;
Flight Arrival Airport;
Date of Flight Arrival;
Flight Number;
Maintenance Event Record to contain the following:
  On-Board Maintenance Record Number;
  Action Code (removed, passenger misuse, no fault found, cable/wiring reseated, deferral, preventative maintenance, others.)
  Specific Seats Impacted;
  Indication of Failure;
  Reason for Maintenance Event Record (Cabin log record number, Maintenance action, fault list);
  LRU removal data including: LRU name, LRU part number, LRU serial number, LRU specific location system.

A further source of data is the bench and shop repair data 120 after an LRU is removed from the aircraft. Such data may include the following:

On-board Maintenance Record Number;
LRU type, part number, serial number, and failure/repair action;
Passenger misuse indication;
Aircraft tail number where an LRU is removed;
Date of an LRU's removal from aircraft.

Once the data is collected and properly formatted, the data is processed to determine the SA 100. It should be noted that not all data from the sources are relevant to SA analysis. For example, a relevant failure may be defined as a loss that affects any flight attendant or passenger's entertainment system service including but not limited to the loss of: video, audio, passenger control unit functions, touch screen functions, telephone functions, interactive applications, entertainment system's mechanical failures, and degradation of video and audio quality at the seat. If the failures are defined as relevant, they will be represented as the elements used in the SA measurement in accordance with the present invention.

Other failures may be deemed irrelevant based on the reasons behind their occurrence and such irrelevant failures are excluded from the SA measurement. For example, failures may be deemed irrelevant if the reasons are:

Improper operation of the supplier's IFE equipment by airline customer's personnel;

Improper operation of other equipment not supplied by the supplier, but required for proper operation of the supplier's IFE equipment;

Improper alteration or repair by others than the Supplier;

Mismatch between each aircraft configuration database and the aircraft's actual configuration;

Failure due to any factors defined as Force Majeure between the supplier and the airline customer.

After the SA analysis, an availability report 130 can be generated for the IFE supplier and the airline customer. Such report, as previously discussed, may be used by the parties to determine whether the supplier's IFE systems have met the guaranteed availability requirements. Such report may also be used by IFE suppliers to forecast the performance of IFE equipment for preventative maintenance purposes.

With reference to FIG. 2, the SA methodology in accordance with the present invention is now described in more detail. Box 20 shows, generally, the process of designating loss factors and zonal weights corresponding to the products and services offered to a customer. Box 21 shows, generally, the intermediate process of mapping subsystem service records to faults/failures. Box 23 shows, generally, the process of calculating subsystem availability and the overall SA for the flight based on the faults/failures and loss factors/zonal weights.

Referring to FIG. 2, in Box 20, the services and products which are offered to a customer are identified (200). Any applicable loss factors and subsystems/zonal weights are also specified (205). To finalize such factors, weights, products and service guarantees for a customer, it typically involves negotiation between the customer and its supplier (210). However, as can be appreciated by those skilled in the art, as more customers sign on to the methodology, it is possible that a more standardized range of products, services, loss factors and weights can be developed for the supplier's IFE systems.

In Box 21, for each flight, on-board service records, including those from a built-in test unit if installed, are mapped to the faults and failures (220). The factors and weights for that customer can be used to map the overhead subsystem LRU faults to overhead display availability per zone (225, 230), if overhead availability is measured. The factors and weights can also be used to map the faults and failures of the cabin file server and passenger access terminal to cabin management subsystem elements (225, 240), if cabin management availability is measured. The factors and weights for that customer can also be used to map the faults and failures of seat LRUs to the seat subsystem (270), after mapping the IFE source faults and failures to IFE source elements (250).

In Box 23, the subsystem availability for the overhead subsystem can be calculated (230, 235). The subsystem availability for the cabin management subsystem can also be calculated (240, 245). The seat subsystem availability can further be calculated (255, 260, 275). And finally, an overall SA for the flight can be calculated by summing all the subsystem availability measures (280).

The methodology of SA tool measures the availability of a supplier's IFE system on board of an aircraft at a point in time, e.g. at departure, in-flight or between departure and arrival. The SA tool processes on-board service, or maintenance log, information along with aircraft configuration data to calculate system availability. Preferably, such information is automatically offloaded from a built-in self-test unit which can detect system failures or isolate faulty LRUs on the aircraft. One example of such built-in tester is the Built-in Test/Built-in Test Equipment system ("BIT/BITE") available from Rockwell Collins, Inc, the Assignee of the present invention.

As can be appreciated by those skilled in the art, measuring an IFE system availability can be done by measuring at least one of the following subsystems: cabin management subsystem availability, overhead subsystem availability, and seat subsystem availability, which may include IFE sources availability. The number for each subsystem is thus available as intermediate calculation result. However, those skilled in the art can readily determine that their availability measurement may be based on one or more subsystems combined. Further, the SA tool is preferably in compliance, as is the SA tool in accordance with the present invention, with the draft ARINC 628 standard for calculating IFE system availability.

The SA tool in accordance with the present invention uses configurable data tables, which allows customization of the calculations without revising the tool, as shown in the following. For example, the element loss factors ("ELF") for the seat system may need to be unique for different IFE service levels to allow more accurate calculations when airlines deploy IFE functionality in phases. In addition, elements that do not apply to an airline's configuration, as indicated by the different IFE system service levels, will have a factor of zero. An example of four levels of IFE service are described in Table 1. It should be appreciated by those skilled in the art that different levels of IFE service can be configured based on their particular applications.

TABLE 1

Example of IFE Service Levels

| IFE Service Level | Description |
| --- | --- |
| Distributed Video Only | Distributed video and audio with in-seat channel selection |
| Basic Interactive | Interactive menu capability to select movies, games, and audio at the seat |
| Full Interactive | Basic Interactive service plus revenue-based services like duty-free and shopping |
| Digital Audio/Video | Full Interactive service plus broadcast digital audio/video or on-demand video and audio control by passenger |

In accordance with the present invention, the SA tool can be tailored for an airline's configuration using the factors and weights defined during contract negotiation between the supplier and the customer. Preferably, there can be a common user interface that allows specific built-in test unit records to be excluded from the availability calculation, e.g. irrelevant failures, or to supplement the availability calculation using an on-board maintenance record that records a removal not reported by the built-in test unit. This feature serves to allow human detectable faults to be included in the availability computation.

Equations. The following equations are used to calculate system availability. The point at which availability is calculated may be based on how the IFE supplier and the airline customer would like to monitor availability. The weight of each subsystem's availability to the overall system availability calculation can be customized using data tables defined in the airline's contract with the IFE supplier.

$$\text{System Availability} = (OSW_H * \text{Overhead Availability}) + \quad \text{Equation 1}$$
$$(CSW_H * \text{Cabin Mgmt Availability})$$
$$(SSW_H * \text{Seat Availability})$$

where:

$OSW$ = overhead system weight (configurable)

$H$ = highest IFE service level (from aircraft database, see Table 1 for Service Levels)

$CSW$ = cabin management system weight (configurable)

$SSW$ = seat system weight (configurable)

and $OSW + CSW + SSW = 100\%$ $$\text{Overhead Availability} = 100 * \quad \text{Equation 2}$$
$$\left( \sum_{k=1,3} (OZ_k * ZS_k * (TD_k - DL_k)/TD_k) \right) \bigg/ \left( \sum_{k=1,3} (OZ_k * ZS_k) \right)$$

where:

$OZ$ = overhead zone weight factor (configurable)

$ZS$ = number of actual seats in zone (from aircraft database)

$TD$ = total number of displays in zone (from aircraft database)

$DL$ = count of displays unavailable in zone (see Notes to Eq. 2)

$k$ = zone index from 1 to 3

For Equation 2, it should be noted that for each display (overhead/bulkhead monitor/LCD or projector) in zone, the display can be marked as unavailable if the display or the tapping unit/VDU for display is declared faulty.

$$\text{Cabin Mgmt Availability} = \quad \text{Equation 3}$$
$$100 - 100 * \min\left(1, \sum_{\text{lost elements}} CMLF_H\right)$$

where:

$CMLF$ = element loss factor for unavailable cabin management elements (see Table 2)

$H$ = highest service level (from aircraft database, see Table 1)

Reference is to Equation 1, where the percentage of system availability is the sum of all three (expandable) subsystem availability measures. As Equation 1 shows, three subsystems are currently evaluated for the system availability calculation. It should be apparent to those skilled in the art that any IFE supplier and airline customer may readily modify the equation to only use the availability sum of one or more subsystems, or to add more subsystems as they become available. However, for the purpose of illustration, the total system availability from the currently implemented three subsystems are described.

Referring to Equations 1, 2, 3 and 6, an airline customer may customize the availability equations by allowing unique weighting factors for each seat and overhead zone. The zone-specific weight factors may be unique between the overhead subsystem and the seat subsystem. If an overhead or seat subsystem is not installed within a zone, then the applicable weight factor for that zone should be set to zero. For example, if there are no overhead units in the first class cabin, then the applicable weight factor is set to zero for the overhead units in the first class zone.

Referring to Equation 2, the equation for Overhead Availability supports an airline customer's need to assess overhead subsystem loss based on the zone weight and number of seats affected in the zone.

Reference is now turned to Table 2. Note that for each cabin management availability element, a configurable loss factor for service level is specified. Whether such element is a loss can be derived from the on-board service data or any built-in test unit such as the aforementioned BIT/BITE.

TABLE 2

Cabin Management Elements

| Cabin Management Availability Element | Factor For Service Level | Source(s) of Loss Indication |
|---|---|---|
| PAT (see * below) | configurable | BB Data |
| Keyboard & Touchscreen | config | Service Data |
| Credit Card Reader | config | Service Data |
| Audio Jack | config | Service Data |
| Modem | config | Service Data |
| Phone | config | BB Data |
| Manual Reset (one reset) | config | BB Data |
| Manual Reset (two resets) | config | BB Data |
| Manual Reset (3 or more) | config | BB Data |
| PAT <-> VCC/AVU | config | BB Data |
| PAT <-> CFS | config | BB Data |
| PAT <-> PESC-V | config | BB Data |
| CFS | | |
| CFS <-> Printer Comm. | config | BB Data |
| CFS <-> PESC-A1 (PAXLAN) | config | BB Data |
| CFS <-> IFE Sources Comm.* | config | BB Data |
| Printer (excl. out of paper) | config | BB/Service |
| CD ROM | config | Service Data |

*If there is more than one PAT or more than one IFE source communication path, then factor is adjusted per Equation 4
Acronyms for Table 2:
PAT Primary Access Terminal
VCC Video Control Center
AVU Audio Video Unit
CFS Cabin File Server
PESC-V Passenger Entertainment System Controller
COMM Communication
PESC-A Passenger Entertainment System Controller
PAXLAN Passenger Local Area Network
BB Data Data from Built-in Test Unit such as BIT/BITE Referring to Equation 3, the equation looks at objective faults/failures and assesses impact to flight attendant functionality loss. Note that the sum of total element loss factors has a maximum of 1, by using the "min" function. This has the benefit of placing a floor, instead of a negative number, on the cabin management subsystem availability when there is a total loss of functionality.

The Control IFE System function group includes functions such as "start and end IFE system," "enter flight data," "control of video announcements," "printing," and "monitor of seat video and audio." The Control IFE Sources function group includes functions to control the audio and video players, movie cycles, cameras, and Airshow. The Control In-Seat Video System function group allows control of seat video channels and reset of seats. The Control Overhead Video System function group controls overhead video.

With aircraft configurations possibly having multiple LRUs of the same type (e.g., tape players, media file servers) that offer redundant capability, a single loss factor is assigned representing the total loss of that capability. When one of these LRUs is declared faulty, a percentage of the loss factor is utilized in the availability calculation.

Likewise, for single LRUs that support multi-channel output (e.g., triple tape deck), a single loss factor is assigned representing total loss of all outputs. When one of these outputs fails, a percentage of the loss factor is utilized in the availability calculation. Equation 4 defines the standard equation that is used and Table 3 identifies the elements and components considered for these types of calculations in the IFE Sources Loss and Seat Availability equations.

TABLE 3

Element Components Definitions

| Element Type | Component Definition |
|---|---|
| Analog Video Sources | Total number of tape slots for all tape decks |
| MFS (Media File Server) | Total number of MFSs |
| Audio Sources | Total number of audio sources |
| Landscape Camera | Total number of landscape cameras |
| Audio Jack | Number of audio jacks at seat |
| IFE Sources Comm. | Total number of 485 comm. ports on CFS |

$$\% \text{ of Element Unavailable} = LF * (FE/TE) \quad \text{Equation 4}$$

where:

$LF$ = loss factor (configurable)

$FE$ = number of element components unavailable (see Table 3)

$TE$ = total number of element components (aircraft database)

TABLE 4

IFE Sources Element Table

| Element Type | # Seats Affected | Factor [HSL] | Source of Loss Indication |
|---|---|---|---|
| Analog Video Sources | all | configurable (see Equation 4) | BB & Service Data |
| MFS | all | configurable (see Equation 4) | BB & Service Data |
| Ethernet Hub | all | configurable | BB & Service Data |
| Audio Sources | all | configurable (see Equation 4) | Service Data |
| Passenger Video Info System | all | configurable | Service Data |
| Landscape Camera | all | configurable (see Equation 4) | Service Data |

Referring to Equation 5 below, the loss associated with IFE sources supplied and serviced by the IFE supplier is calculated separately in accordance with the ARINC 628 draft standard for IFE system availability numbers. Note that the IFE Sources Loss of Equation 5 is inverse to ARINC 628 IFE Source Availability. This equation calculates the cumulative effect of all IFE source losses. This result is used in the Seat subsystem availability calculation and is applied to all seats in the aircraft.

$$\text{IFE Sources Loss} = \sum_{IFE\ elements} ISE_H \qquad \text{Equation 5}$$

where:

$ISE$ = loss factors for unavailable IFE Sources (see Table 4)

$H$ = highest IFE service level (aircraft database, see Table 1)

TABLE 5

Seat System Elements

| Element Type | # Seats Affected | Factor [HSL] | Sources of Loss Indication |
|---|---|---|---|
| PVP/PVP Power Supply | 1 | configurable | BB & Service Data |
| Audio Jack | 1 | configurable (see Equation 4) | Service Data |
| PCU | 1 | configurable | BB & Service Data |
| SDU | 1 | configurable | BB & Service Data |
| AVU | aircraft db | configurable | BB & Service Data |
| SCC Only | 1 | configurable | BB & Service Data |
| Phone Only | aircraft db | configurable | BB & Service Data |
| Manual Reset (one reset) | 1 | configurable | BIT/BITE Data |
| Manual Reset (two resets) | 1 | configurable | BIT/BITE Data |
| Manual Reset (three or more) | 1 | configurable | BIT/BITE Data |
| ADB | aircraft db | configurable | BB & Service Data |
| Column Only | aircraft db | configurable | BB & Service Data |
| Phone Col. Only | aircraft db | configurable | BB & Service Data |
| Manual Col. Reset (one reset) | aircraft db | configurable | BIT/BITE Data |
| Manual Col. Reset (two resets) | aircraft db | configurable | BIT/BITE Data |
| Manual Col. Reset (three or more) | aircraft db | configurable | BIT/BITE Data |
| CFS/TES CFS | all | configurable | BB & Service Data |
| Manual Reset (one reset) | all | configurable | BIT/BITE Data |
| Manual Reset (two resets) | all | configurable | BIT/BITE Data |
| Manual Reset (three or more) | all | configurable | BIT/BITE Data |
| VMOD | all | configurable | BB & Service Data |
| PESC-V | all | configurable | BB & Service Data |
| PESC-A1 | all | configurable | BB & Service Data |
| PESC-A2 | all | configurable | BB & Service Data |
| RF Distribution Box | all | configurable | Service Data |

Acronyms for Table 5
PVP Passenger Video Player
PCU Passenger Control Unit
SDU Seat Display Unit
AVU Audio Video Unit
SCC Seat Controller Card
ADB Area Distribution Box
CFS Cabin File Server
TES Total Entertainment System
VMOD Video Modulator
PESC Passenger Entertainment System Controller
RF Radio Frequency $$\text{Seat Availability} = 100 * \left( \sum_{k=1,3} (SZ_k * (ZS_k - SL_k)) \right) \Big/ \left( \sum_{k=1,3} (SZ_k * ZS_k) \right) \qquad \text{Equation 6}$$

where:

$SZ$ = seat zone weight factor (configurable)

$ZS$ = number of actual seats in zone (aircraft database)

$k$ = zone index from one to three $$\text{and} \quad SL = \sum_{s=1,ZS} \min\left(1, ISL + \sum_{lost\ elements} ELF_{Hs}\right)$$

where $ISL$ = IFE Sources Loss (see Equation 5)

$ELF$ = element loss factor for unavailable seat elements (see Table 5)

$H$ = highest IFE service level (aircraft database, see Table 1)

$s$ = seat index from one to $ZS$

The system availability tool in accordance with the present invention can provide more accurate measurement of passenger impact, flight attendant impact and overhead impact separately as subsystems, or as a total system. The tool also provides differentiation between multiple levels of functionality and different zonal weighting. The tool with customizable data tables thus leads to a standardized methodology for measuring system availability without having to revise the tool from airline to airline, or for revised subsystem installations.

In the foregoing specification, the invention has been described with reference to specific embodiments thereof. It will, however, be evident that various modifications and changes may be made thereto without departing from the broader spirit and scope of the invention. The specification and drawings are accordingly to be regarded in an illustrative rather than a restrictive sense.

We claim:

1. A method of measuring availability of an in-flight entertainment system ("IFE") on an aircraft, comprising the steps of:
    a) identifying a plurality of elements of an IFE on an aircraft to be measured;
    b) for each of said plurality of elements, designating a loss factor representative of a value degradation when said element becomes unavailable due to fault;
    c) collecting fault information regarding said IFE on said aircraft;
    d) mapping said fault information of said IFE to said plurality of elements;
    e) calculating system availability based on said loss factor for each element and corresponding fault information.

2. The method according to claim 1, wherein:
    Step b) further comprises designating a zonal weight for each element of said IFE; and
    Step e) of calculating system availability further based on said zonal weight for each element.

3. The method according to claim 2, wherein said IFE comprises a plurality of subsystems of elements, further comprising a step of designating a subsystem weight factor for each element, the sum of all subsystem weight factors being equal to a predetermined number.

4. A method of measuring availability of at least one subsystem of an in-flight entertainment ("IFE") on an aircraft, comprising:

a) designating at least one subsystem weight factor to said at least one subsystem, whereas the sum of all subsystem weight factors is equal to a predetermined number;
b) selecting at least one element of said subsystem to be measured;
c) designating a zonal weight factor for said at least one element based on a predetermined class to be serviced by said at least one element;
d) designating a level of service for said at least one element;
e) designating an element loss factor based on said level of service for said at least one element, said element loss factor representative of a value degradation when said element becomes unavailable due to fault;
f) collecting performance information regarding said IFE on said aircraft;
g) mapping said performance information to said subsystem;
h) measuring said subsystem's availability based on said subsystem weight factor, said zonal weight factor, said element loss factor and said level of service for each element.

5. A method according to claim 4, wherein said IFE comprises at least one of seat availability subsystem, overhead subsystem and cabin management subsystem.

6. A method according to claim 5, wherein said seat availability system, overhead subsystem and cabin management subsystem are calculated based on the following equations:

$$\text{Overhead Availability} = 100 * \left( \sum_{k=1,3} (OZ_k * ZS_k * (TD_k - DL_k)/TD_k) \right) \Bigg/ \left( \sum_{k=1,3} (OZ_k * ZS_k) \right)$$

where: $OZ$ = overhead zone weight factor $ZS$ = number of actual seats in zone $TD$ = total number of displays in zone $DL$ = count of displays unavailable in zone $k$ = zone index from 1 to 3;

$$\text{Cabin Mgmt Availability} = 100 - 100 * \min\left(1, \sum_{\text{lost elements}} CMLF_H \right)$$

where: $CMLF$ = element loss factor for unavailable cabin management elements $H$ = highest service level;

$$\text{Seat Availability} = 100 * \left( \sum_{k=1,3} (SZ_k * (ZS_k - SL_k)) \right) \Bigg/ \left( \sum_{k=1,3} (SZ_k * ZS_k) \right)$$

where: $SZ$ = seat zone weight factor $ZS$ = number of actual seats in zone $k$ = zone index from one to three and $$SL = \sum_{s=1,ZS} \min\left(1, ISL + \sum_{\text{lost elements}} ELF_{Hs} \right)$$

where $ISL$ = IFE Sources Loss $ELF$ = element loss factor for unavailable seat elements $H$ = highest IFE service level $s$ = seat index from one to $ZS$;

$$\text{where IFE Sources Loss} = \sum_{\text{IFE elements}} ISE_H$$

where: $ISE$ = loss factors for unavailable IFE Sources $H$ = highest IFE service level.

7. A method of using a computer to calculate overhead subsystem availability for an in-flight entertainment system on an aircraft, comprising the steps of:
   a) designating an overhead zone weight factor;
   b) specifying the number of actual seats in at least one zone corresponding to said aircraft's configuration;
   c) specifying the number of total displays in at least one zone corresponding to said aircraft's configuration;
   d) collecting performance information of said IFE on said aircraft;
   e) determining the number of displays unavailable in said at least one zone on said aircraft during the predetermined period;
   f) calculating overhead availability based on said overhead zone weight factor, number of actual seats in said at least one zone, total number of displays in said at least one zone, number of unavailable displays in said at least one zone;
   g) outputting said overhead availability number.

8. The method according to claim 7, wherein the Step f) uses the following equation:

$$\text{Overhead Availability} = 100 * \left( \sum_{k=1,3} (OZ_k * ZS_k * (TD_k - DL_k)/TD_k) \right) \Big/ \left( \sum_{k=1,3} (OZ_k * ZS_k) \right)$$

where: $OZ$ = overhead zone weight factor $ZS$ = number of actual seats in zone $TD$ = total number of displays in zone $DL$ = count of displays unavailable in zone $k$ = zone index from 1 to 3.

9. A method of using a computer to calculate cabin management subsystem availability for an in-flight entertainment system on an aircraft, comprising the steps of:
   a) designating an element loss factor for each unavailable cabin management element, representative of value degradation if an element becomes unavailable;
   b) specifying a highest level of IFE service for each element corresponding to said aircraft's configuration;
   c) calculating the cabin management subsystem availability based on said element loss factor and said highest level of IFE service, wherein the total of element loss factors is maximized at 1;
   d) outputting the cabin management availability number.

10. A method according to claim 9, wherein Step c) of calculating uses the following equation:

$$\text{Cabin Mgmt Availability} = 100 - 100 * \min\left(1, \sum_{\text{lost elements}} CMLF_H\right)$$

where: $CMLF$ = element loss factor for unavailable cabin management elements $H$ = highest service level.

11. A method of using a computer to calculate seat subsystem availability for an in-flight entertainment system on an aircraft, comprising the steps of:
   a) designating a seat zone weight factor;
   b) specifying the number of actual seats in at least one zone corresponding to said aircraft's configuration;
   c) specifying a loss factor for each of unavailable IFE sources;
   d) specifying a highest level of IFE service level for each element corresponding to said aircraft's configuration;
   e) designating a element loss factor for each unavailable seat element;
   f) calculating IFE sources loss based on loss factors for unavailable IFE sources and the highest IFE service level;
   g) calculating seat availability based on IFE sources loss, seat zone weight factor, number of actual seats in zone;
   h) outputting said seat availability number.

12. A method according to claim 11, wherein the step of calculating IFE sources loss uses the following equation:

$$\text{IFE Sources Loss} = \sum_{\text{IFE elements}} ISE_H$$

where: $ISE$ = loss factors for unavailable IFE Sources $H$ = highest IFE service level, and the step of calculating seat availability uses the following equation:

$$\text{Seat Availability} = 100 * \left( \sum_{k=1,3} (SZ_k * (ZS_k - SL_k)) \right) \Big/ \left( \sum_{k=1,3} (SZ_k * ZS_k) \right)$$

where: $SZ$ = seat zone weight factor $ZS$ = number of actual seats in zone $k$ = zone index from one to three and $SL = \sum_{s=1,ZS} \min\left(1, ISL + \sum_{\text{lost elements}} ELF_{Hs}\right)$ where $ISL$ = IFE Sources Loss $ELF$ = element loss factor for unavailable seat elements $H$ = highest IFE service level $s$ = seat index from one to $ZS$.

* * * * *